(No Model.)

P. H. DECKER.
LEAD CORRODING POT.

No. 347,997. Patented Aug. 24, 1886.

WITNESSES:
John H. Reemer
C. Sedgwick

INVENTOR:
P. H. Decker
BY Munn & Co
ATTORNEYS.

UNITED STATES PATENT OFFICE.

PETER H. DECKER, OF ELLENVILLE, NEW YORK.

LEAD-CORRODING POT.

SPECIFICATION forming part of Letters Patent No. 347,997, dated August 24, 1886.

Application filed November 25, 1884. Serial No. 148,823. (No model.)

*To all whom it may concern:*

Be it known that I, PETER H. DECKER, of Ellenville, in the county of Ulster and State of New York, have invented a new and Improved Lead-Corroding Pot, of which the following is a full, clear, and exact specification.

This invention relates to the pots used in corroding lead with acetic acid to form carbonate of lead, (white lead;) and the invention consists in the construction hereinafter described and claimed.

Reference is to be had to the accompanying drawings, forming part of this specification, in which similar letters of reference indicate corresponding parts in both the figures.

Figure 1:
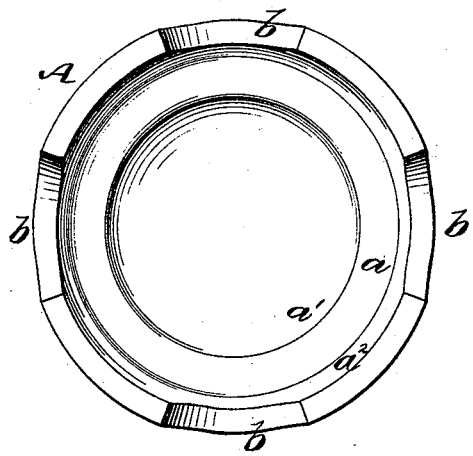
Figure 2:
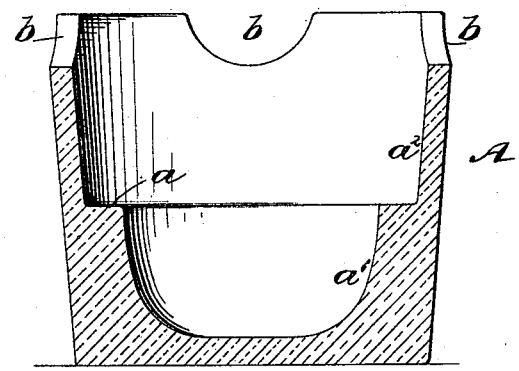

Figure 1 is a plan view of my new and improved lead-corroding pot, and Fig. 2 is a sectional elevation of the same.

The new lead-corroding pot A is made of glass, and is formed with the shoulder $a$ upon the inside, so that the lower part, $a'$, of the pot is made thicker and of smaller internal diameter than the upper part, $a^2$, as shown clearly in Fig. 2. At its upper edge I form the pot with openings $b$, which are, by preference, formed by cutting away the edge of the pot, as shown.

In use the acid for corroding is placed in the bottom of the pot, and the metallic lead is placed in the pot so as to rest upon the shoulder $a$ above the acid. In this condition the pot is ready to be placed in the tan bark or other material for corrosion in the ordinary manner. By making the openings $b$ at the top of the pot the vapors and gases are free to circulate uniformly to and from the interior of the pot, and in packing the pot in the tan-bark, owing to the openings $b$, the boards used to cover the pots may be placed directly upon the edges of the pots, thus avoiding the necessity of using the intermediate supports commonly used for elevating the covering-boards slightly above the edges of the pots; and by making the pots of glass they may be made comparatively thin, to occupy small space, and yet possess sufficient strength, and another advantage is, that the glass pots will not absorb the acid, as do the earthen pots commonly used.

Having thus described my invention, what I claim as new, and desire to secure by Letters Patent, is—

As an improved article of manufacture, a lead-corroding pot, A, made of glass and formed with the shoulder $a$ and the notches $b$ in its upper edge, substantially as set forth.

PETER H. DECKER.

Witnesses:
S. M. TAYLOR,
JACOB M. HOORNBECK.